(12) United States Patent
Tano et al.

(10) Patent No.: US 10,818,945 B2
(45) Date of Patent: Oct. 27, 2020

(54) VOLTAGE CONTROL SYSTEM, FUEL CELL SYSTEM, AND CONTROL METHOD FOR VOLTAGE CONTROL SYSTEM

(71) Applicant: TOYOTA JIDOSHA KABUSHIKI KAISHA, Toyota-shi, Aichi-ken (JP)

(72) Inventors: Yutaka Tano, Toyota (JP); Kenji Umayahara, Miyoshi (JP); Takahiro Umehara, Toyota (JP); Tomoya Ogawa, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 920 days.

(21) Appl. No.: 15/439,027

(22) Filed: Feb. 22, 2017

(65) Prior Publication Data

US 2017/0250424 A1     Aug. 31, 2017

(30) Foreign Application Priority Data

Feb. 26, 2016   (JP) ................. 2016-035470

(51) Int. Cl.
| | |
|---|---|
| *H01M 8/04858* | (2016.01) |
| *H01M 8/04537* | (2016.01) |
| *H01M 8/04992* | (2016.01) |
| *B60L 58/40* | (2019.01) |
| *B60L 53/20* | (2019.01) |
| *H01M 8/1018* | (2016.01) |

(52) U.S. Cl.
CPC ......... *H01M 8/04873* (2013.01); *B60L 53/20* (2019.02); *B60L 58/40* (2019.02); *H01M 8/04567* (2013.01); *H01M 8/04992* (2013.01); *B60L 2250/26* (2013.01); *H01M 2008/1095* (2013.01); *H01M 2250/20* (2013.01); *Y02T 10/7072* (2013.01); *Y02T 90/127* (2013.01); *Y02T 90/14* (2013.01); *Y02T 90/32* (2013.01); *Y02T 90/34* (2013.01)

(58) Field of Classification Search
None
See application file for complete search history.

(56) References Cited

U.S. PATENT DOCUMENTS

2015/0088320 A1*   3/2015   Mizuno ................. H02M 3/156
                                                                                                                                         700/282

FOREIGN PATENT DOCUMENTS

JP       2015-19448       1/2015

\* cited by examiner

*Primary Examiner* — Sarah A. Slifka
(74) *Attorney, Agent, or Firm* — Finnegan, Henderson, Farabow, Garrett & Dunner, LLP (57) ABSTRACT

A voltage control system includes a converter device, and a controller configured to set a duty ratio according to a current target value so as to cause the converter device to repeatedly perform a boost operation according to the duty ratio. The controller is configured to set the duty ratio by use of a basic term including a feedforward term, and an additional term, the feedforward term being derived by use of a measured value of a magnitude of an input of a reactor provided in the converter device and a measured value of a magnitude of an output of the reactor or by use of respective target values of the magnitude of the input and the magnitude of the output in the reactor, the additional term being derived by use of the variation of the current target value during one cycle.

16 Claims, 6 Drawing Sheets

VOLTAGE CONTROL SYSTEM, FUEL CELL SYSTEM, AND CONTROL METHOD FOR VOLTAGE CONTROL SYSTEM

INCORPORATION BY REFERENCE

The disclosure of Japanese Patent Application No. 2016-035470 filed on Feb. 26, 2016 including the specification, drawings and abstract is incorporated herein by reference in its entirety.

BACKGROUND

1. Technical Field

The present disclosure relates to a voltage control system, a fuel cell system, and a control method for a voltage control system.

2. Description of Related Art

A fuel cell system causes a fuel cell to generate electric power, so as to output a target electric power corresponding to a request from an external load such as a motor, accessories in the system, and the like. In order to efficiently output an output power of the fuel cell to the external load, the accessories, and the like, a voltage control system that increase the output voltage of the fuel cell by use of a converter is incorporated in the fuel cell system (e.g., Japanese Patent Application Publication No. 2015-19448 (JP 2015-19448 A)). The converter is constituted by, for example, a reactor, which is an inductance element, and a switching element that controls a current flow to the reactor. A boost operation of the converter is controlled by a duty ratio indicative of a ratio of an opening/closing period of the switching element in one cycle. Generally, the duty ratio of the converter is feedback-controlled based on a measured value of an input voltage of the converter and a measured value of an output voltage thereof.

SUMMARY

It is desired that the fuel cell system have further higher response and followability to a request of the target electric power. Accordingly, even if the target electric power changes remarkably in a short time, it is desirable that delay of the feedback control in the converter and an occurrence of overshoot be restrained. An object to increase controllability of such a converter is not limited to the fuel cell system or a voltage control system incorporated into the fuel cell system, but is also an object common to a general voltage control system using a converter.

The present disclosure provides a voltage control system, a fuel cell system, and a control method for a voltage control system.

A voltage control system according to a first aspect of the present disclosure controls an output voltage according to a current target value. The voltage control system includes a converter device and a controller. The converter device includes a reactor that accumulates an electrical energy, and the converter device is configured to operate at a duty ratio determined as a ratio of an accumulation period in which the energy is input and accumulated into the reactor in one cycle, so as to increase an input voltage. The controller is configured to set the duty ratio according to the current target value so as to cause the converter device to repeatedly perform a boost operation of the input voltage. The controller is configured to set the duty ratio by use of a basic term including a feedforward term, and an additional term, the feedforward term being derived by use of respective target values of a magnitude of an input of the reactor and a magnitude of an output of the reactor, the respective target values being set according to the current target value, the additional term being derived by use of a variation of the current target value during the one cycle and being added to change the duty ratio according to the variation.

According to the voltage control system of the first aspect, the additional term is acquired by use of a known value, which is a variation of the current target value corresponding to a difference between a previous value and a present value of the current target value. Even if the current target value is greatly changed during the one cycle by changing the duty ratio by the additional term, an occurrence of a response delay of the converter device with respect to the change of the current target value is restrained. Thus, in the voltage control system of this aspect, not only the basic term derived by use of the target values about the input and output of the reactor, but also the additional term to which the variation of the current target value is reflected are used, so that controllability of the converter device is increased.

The voltage control system according to the first aspect further includes an output measuring portion configured to measure the magnitude of the output from the reactor. The controller may be configured to set the duty ratio by use of the basic term in which a feedback term is added to the feedforward term, and the additional term, the feedback term being derived by use of a measured value of the magnitude of the output of the reactor and the target value of the magnitude of the output of the reactor.

According to the above aspect, due to the feedback term, it is possible to reflect, to the duty ratio, a difference between the target value of the magnitude of the output of the reactor and a magnitude of an actual output thereof.

A voltage control system according to a second aspect of the present disclosure controls an output voltage according to a current target value. The voltage control system includes a converter device, an input measuring portion, an output measuring portion, and a controller. The converter device includes a reactor that accumulates an electrical energy, and the converter device is configured to operate at a duty ratio determined as a ratio of an accumulation period in which the energy is input and accumulated into the reactor in one cycle, so as to increase an input voltage. The input measuring portion is configured to measure a magnitude of an input with respect to the reactor. The output measuring portion is configured to measure a magnitude of an output from the reactor. The controller is configured to set the duty ratio according to the current target value so as to cause the converter device to repeatedly perform a boost operation of the input voltage. The controller is configured to set the duty ratio by use of a basic term including a feedforward term, and an additional term, the feedforward term being derived by use of a measured value of a magnitude of an input of the reactor and a measured value of a magnitude of an output of the reactor, the additional term being derived by use of a variation of the current target value during the one cycle and being added to change the duty ratio according to the variation.

According to the voltage control system of the second aspect, even if the current target value is greatly changed during the one cycle by changing the duty ratio by the additional term, an occurrence of a response delay of the converter device with respect to the change of the current target value is restrained. Thus, in the voltage control system of this aspect, not only the basic term derived by use of the measured values about the input and output of the reactor, but also the additional term to which the variation of the current target value is reflected are used, so that the controllability of the converter device is increased.

In the voltage control system of the second aspect, the controller may be configured to set the duty ratio by use of the basic term in which a feedback term is added to the feedforward term, and the additional term, the feedback term being derived by use of the measured value of the magnitude of the output of the reactor and a target value of the magnitude of the output of the reactor, the target value being set according to the current target value.

According to the second aspect, due to the feedback term, it is possible to reflect, to the duty ratio, the difference between the target value of the magnitude of the output of the reactor and a magnitude of an actual output thereof.

In the voltage control system according to the above aspect, the controller may set the additional term such that a sum total of a variation of the electrical energy accumulated in the reactor during the one cycle and a variation of the electrical energy discharged from the reactor corresponds to the variation of the current target value during the one cycle.

According to the voltage control system of the above aspect, the additional term is set as a more appropriate value, so that the controllability of the converter device is increased still more.

In the above aspect, the controller may be configured to use, as the additional term, a value of $\alpha/T$ obtained as $\alpha/T=(L\cdot\Delta I)/V_{Ht}$, wherein $\Delta I$ indicates the variation of the current target value, L indicates an inductance of the reactor, T indicates a period of the one cycle, and $V_{Ht}$ indicates a target value of an output voltage of the reactor, the target value being the target value of the magnitude of the output of the reactor.

According to the above aspect, it is possible to obtain a more appropriate additional term corresponding to the variation according to the current target value.

The voltage control system according to the above aspect may further include an output measuring portion configured to measure an output voltage of the reactor, and the controller may be configured to use, as the additional term, a value of $\alpha/T$ obtained as $\alpha/T=(L\cdot\Delta I)/V_H$, wherein $\Delta I$ indicates the variation of the current target value, L indicates an inductance of the reactor, T indicates a period of the one cycle, and $V_H$ indicates a measured value of the output voltage of the reactor.

According to the aspect, it is possible to obtain a more appropriate additional term.

In the voltage control system of the above aspect, the output measuring portion may be configured to measure the output voltage of the reactor as the magnitude of the output of the reactor, and the controller may be configured to use, as the additional term, a value of $\alpha/T$ obtained as $\alpha/T=(L\cdot\Delta I)/V_H$, wherein $\Delta I$ indicates the variation of the current target value, L indicates an inductance of the reactor, T indicates a period of the one cycle, and $V_H$ indicates a measured value of the output voltage of the reactor.

According to the aspect, it is possible to obtain a more appropriate additional term.

In the voltage control system of the above aspect, the controller may be configured such that: when the variation is a predetermined threshold or more, the controller sets the duty ratio by use of the basic term and the additional term, and when the variation is less than the predetermined threshold, the controller sets the duty ratio without using the additional term.

According to the above aspect, a transient period in which the current target value suddenly changes is distinguished from the other normal control period, and only in a case of the transient period, the additional term is used for the setting of the duty ratio. This accordingly makes it possible to restrain the duty ratio from becoming larger than required by use of the additional term during the normal control period. Accordingly, the controllability of the converter device is increased still more.

A fuel cell system according to a third aspect of the present disclosure includes a fuel cell and the voltage control system of any of the above aspects, and the voltage control system is configured to increase a voltage output from the fuel cell as the input voltage.

According to the fuel cell system of the third aspect, the output voltage of the fuel cell can be increased more accurately according to the target value.

A control method for a voltage control system according to a fourth aspect of the present disclosure is a control method for a voltage control system including a converter device including a reactor that accumulates an electrical energy, the converter device being configured to operate at a duty ratio determined as a ratio of an accumulation period in which the energy is input and accumulated into the reactor in one cycle, so as to increase an input voltage, the voltage control system being configured to output an output voltage obtained by increasing the input voltage according to a current target value. The control method includes setting the duty ratio according to the current target value so as to cause the converter device to repeatedly perform a boost operation, wherein the duty ratio is set by use of a basic term including a feedforward term, and an additional term, the feedforward term being derived by use of respective target values of a magnitude of an input of the reactor and a magnitude of an output of the reactor, the respective target values being set according to the current target value, the additional term being derived by use of a variation of the current target value during the one cycle and being added to change the duty ratio according to the variation.

According to the control method of the above aspect, the additional term to which the variation of the current target value is reflected is used for the setting of the duty ratio, so that an occurrence of a response delay of the converter device with respect to the change of the current target value is restrained. Accordingly, the controllability of the converter device is increased.

A control method for a voltage control system according to a fifth aspect of the present disclosure is a control method for a voltage control system including a converter device including a reactor that accumulates an electrical energy, the converter device being configured to operate at a duty ratio determined as a ratio of an accumulation period in which the energy is input and accumulated into the reactor in one cycle, so as to increase an input voltage, the voltage control system being configured to output an output voltage obtained by increasing the input voltage according to a current target value. The control method includes setting the duty ratio according to the current target value so as to cause the converter device to repeatedly perform a boost operation, such that a magnitude of an input and a magnitude of an output in the reactor are measured, so that the duty ratio is set by use of a basic term including a feedforward term, and an additional term, the feedforward term being derived by use of a measured value of the magnitude of the input of the reactor and a measured value of the magnitude of the output of the reactor, the additional term being derived by use of a variation of the current target value during the one cycle and being added to change the duty ratio according to the variation.

According to the control method of the fifth aspect, the additional term to which the variation of the current target value is reflected is used for the setting of the duty ratio, so that an occurrence of a response delay of the converter device with respect to the change of the current target value is restrained.

Not all the plurality of constituents included in each aspect of the present disclosure is necessary, and in order to solve a part or all of the abovementioned object s or in order to achieve a part or all of the effects described herein, some of the plurality of constituents may be modified, deleted, or replaced with other new constituents appropriately, and a limitative content may be partially deleted. Further, in order to solve a part or all of the abovementioned objects or in order to achieve a part or all of the effects described herein, a part or all of the technical features included in one aspect of the present disclosure may be combined with a part or all of the technical features included in another aspect of the present disclosure so as to form one independent aspect of the present disclosure. Further, the controller described in each aspect may be one provided as a single independent unit so as to demonstrate a function described in the each aspect, or may be incorporated integrally into a unit that demonstrates other various control functions as a part of the unit. Further, individual functions of the controller described in each aspect may be implemented only by a single unit constituting the controller or may be implemented individually by a plurality of units provided separately/independently so as to constitute the controller in cooperation with each other. For example, a function to set the duty ratio of the converter device and a function to cause the converter device to repeatedly perform a boost operation may be implemented by separate units constituting the controller. Similarly, a function to set the duty ratio of the converter device and a function to set the target value of the magnitude of the input and the target value of the magnitude of the output in the reactor may be implemented by separate units constituting the controller. The units include a circuit, a computer, and the like.

The present disclosure is achievable in various aspects other than the voltage control system, the control method thereof, and the fuel cell system. For example, the present disclosure is achievable in aspects such as a vehicle provided with the voltage control system and the fuel cell system, a control method for the converter device, a voltage boosting method, a control method for the fuel cell system, and a recording medium which is not a temporal medium and which stores a computer program to implement various methods described above.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
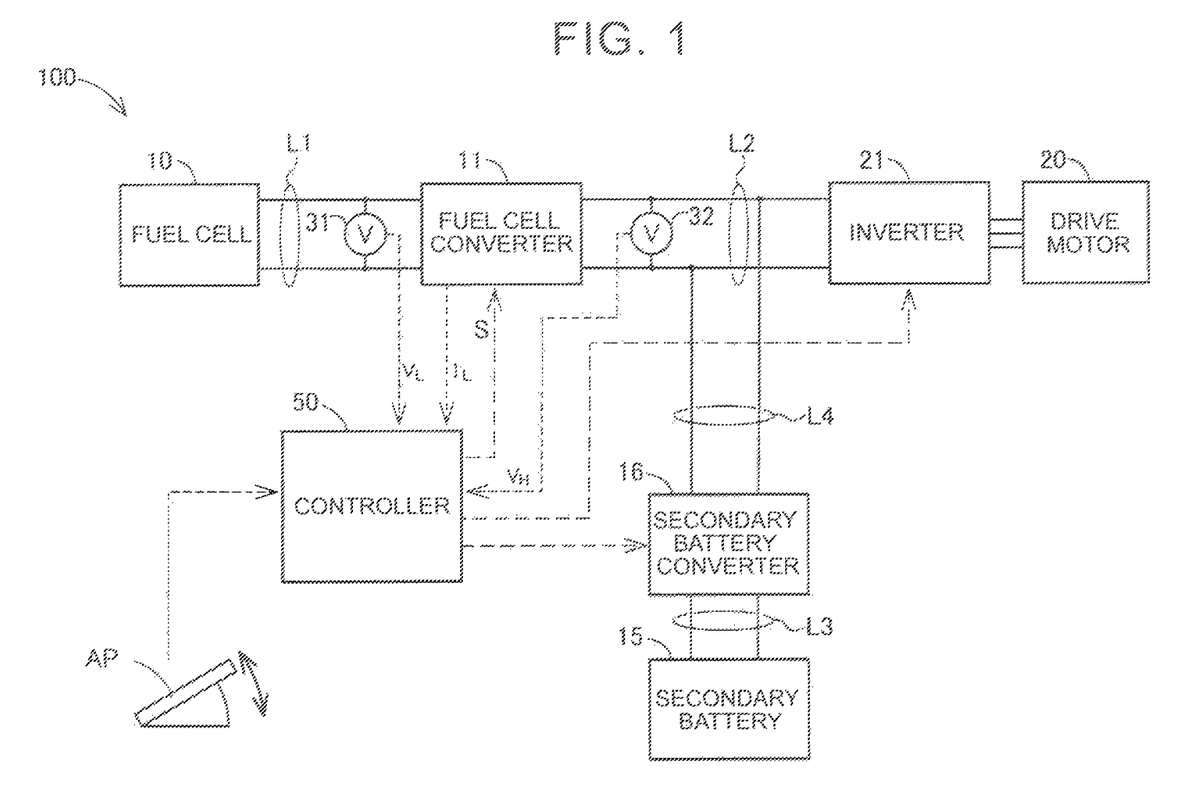
FIG. 1 is a schematic view illustrating an electrical configuration of a fuel cell system.

Embodiment: FIG. 1 is a schematic view illustrating an electrical configuration of a fuel cell system 100 according to one embodiment of the present disclosure. The fuel cell system 100 is provided in a fuel cell vehicle. The fuel cell system 100 generates a driving force of the fuel cell vehicle to a drive motor 20 by use of an electric power generated by a fuel cell 10 in response to a driver's request received via an accelerator pedal AP. In addition to the fuel cell 10 and the drive motor 20, the fuel cell system 100 includes a fuel cell converter 11, a secondary battery 15, a secondary battery converter 16, an inverter 21, a first voltage measuring portion 31, a second voltage measuring portion 32, and a controller 50. As described below, in the fuel cell system 100, the fuel cell converter 11, the first voltage measuring portion 31, the second voltage measuring portion 32, and the controller 50 function as a voltage control system that increases a voltage output from the fuel cell 10 to a target voltage set by the controller 50.

The fuel cell 10 is a solid polymer fuel cell configured to generate an electric power upon receipt of hydrogen and oxygen as reactant gases. The fuel cell 10 is not limited to the solid polymer fuel cell, and various types of fuel cells can be employed as the fuel cell 10. For example, as the fuel cell 10, a polymer electrode fuel cell may be employed instead of the solid polymer fuel cell. The fuel cell 10 is connected to an input terminal of the fuel cell converter 11 via a first direct current lead-wire L1.

The fuel cell converter 11 is a boost-up converter device, and under control of the controller 50, the fuel cell converter 11 performs a boost operation of increasing an input voltage input from the fuel cell 10 to a target voltage. An output terminal of the fuel cell converter 11 is connected to a direct current terminal of the inverter 21 via a second direct current lead-wire L2. A relay circuit may be provided between the fuel cell converter 11 and the inverter 21. The fuel cell converter 11 transmits a measured value $I_L$ of a reactor current (described later) to the controller 50 via a signal wire. The fuel cell converter 11 may be constituted by use of an intelligent power module (IPM). Details of a configuration and an operation of the fuel cell converter 11 will be described later.

The secondary battery 15 is constituted by a lithium ion battery, for example, and functions as a power source of the fuel cell system 100 together with the fuel cell 10. The secondary battery 15 is connected to an input terminal of the secondary battery converter 16 via a third direct current lead-wire L3.

The secondary battery converter 16 is a boost-up converter device, and has a configuration similar to the fuel cell converter 11. An output terminal of the secondary battery converter 16 is connected to the second direct current lead-wire L2 that connects the fuel cell converter 11 to the inverter 21, via a fourth direct current lead-wire L4. Under the control of the controller 50, the secondary battery converter 16 controls charge/discharge of the secondary battery 15 by adjusting a voltage in the second direct current lead-wire L2, which is an input voltage of the inverter 21, in cooperation with the fuel cell converter 11. When an output power from the fuel cell converter 11 is insufficient to a target output power, the secondary battery converter 16 causes the secondary battery 15 to perform discharging. In the meantime, when a regenerative power is generated in the drive motor 20, the secondary battery converter 16 causes the secondary battery 15 to accumulate the regenerative power therein. Note that the secondary battery converter 16 may have a configuration different from the fuel cell converter 11.

As described above, the drive motor 20 is a power source that drives wheels of the fuel cell vehicle, and is constituted by a three-phase alternating current motor, for example. The drive motor 20 is connected to an alternating current terminal of the inverter 21 via an alternating current lead-wire.

The inverter 21 is a DC/AC inverter, and in response to a command from the controller 50, the inverter 21 converts, into an electric power of a three phase alternating current, an electric power supplied with a direct current from the fuel cell 10 and the secondary battery 15 via the second direct current lead-wire L2, and supplies it to the drive motor 20. Further, the inverter 21 converts a regenerative power generated in the drive motor 20 into a direct-current power and outputs it to the second direct current lead-wire L2. The inverter 21 may be constituted by use of IPM. The fuel cell system 100 may include a plurality of inverters 21, and accessories (not shown) other than the drive motor 20 may be electrically connected to the second direct current lead-wire L2 via respective inverters 21.

The first voltage measuring portion 31 is connected to the first direct current lead-wire L1, and measures an input voltage of the fuel cell converter 11 so as to output a signal indicative of its measured value $V_L$, to the controller 50. The second voltage measuring portion 32 is connected to the second direct current lead-wire L2, and measures an output voltage of the fuel cell converter 11 so as to output a signal indicative of its measured value $V_1$ to the controller 50. The first and second voltage measuring portions 31, 32 may be each constituted by a voltage sensor, for example. Note that the input voltage and the output voltage of the fuel cell converter 11 correspond to an input voltage and an output voltage of a reactor (described later) of the fuel cell converter 11, respectively. The first voltage measuring portion 31 measures the input voltage as a magnitude of an input to the reactor and can be interpreted as one subordinate concept of art input measuring portion in the present disclosure. Further, the second voltage measuring portion 32 measures the output voltage as a magnitude of an output from the reactor and can be interpreted as one subordinate concept of an output measuring portion in the present disclosure. Note that, in the present specification, "the magnitude of the input" and "the magnitude of the output" of the fuel cell converter 11 and the reactor correspond to a magnitude of an electrical energy accumulated in the reactor, and can be interpreted to indicate a magnitude of any of a current, a voltage, and an electric power.

The controller 50 is constituted by a microcomputer including a central processing unit, a main storage, and a nonvolatile storage portion, and is connected to the fuel cell converter 11, the secondary battery converter 16, and the inverter 21 via signal wires. The controller 50 controls the fuel cell converter 11, the secondary battery converter 16, and the inverter 21, so as to control output powers of the fuel cell 10 and the secondary battery 15, thereby causing the drive motor 20 to generate a driving farce corresponding to an output request from a driver. Further, the controller 50 generates a control signal S (described later) corresponding to an output request received externally, so as to control an operation of the fuel cell converter 11. The controller 50 uses, for the control on the fuel cell converter 11, the measured value $I_L$ of a reactor current received from the fuel cell converter 11, and the measured values $V_L$, $V_H$ of the input voltage and the output voltage of the fuel cell converter 11, received from the first and second voltage measuring portions 31, 32. Details of a control procedure of the fuel cell converter 11 by the controller 50 will be described later. Note that the controller 50 may be a single unit constituted for the purpose of controlling the fuel cell system 100, or may be constituted as a part of a control unit having various control functions, such as a control unit that controls the whole fuel cell vehicle, for example. Further, the controller 50 may be constituted by a plurality of circuits, units, modules, and the like individually implementing various functions described later.

Figure 2:
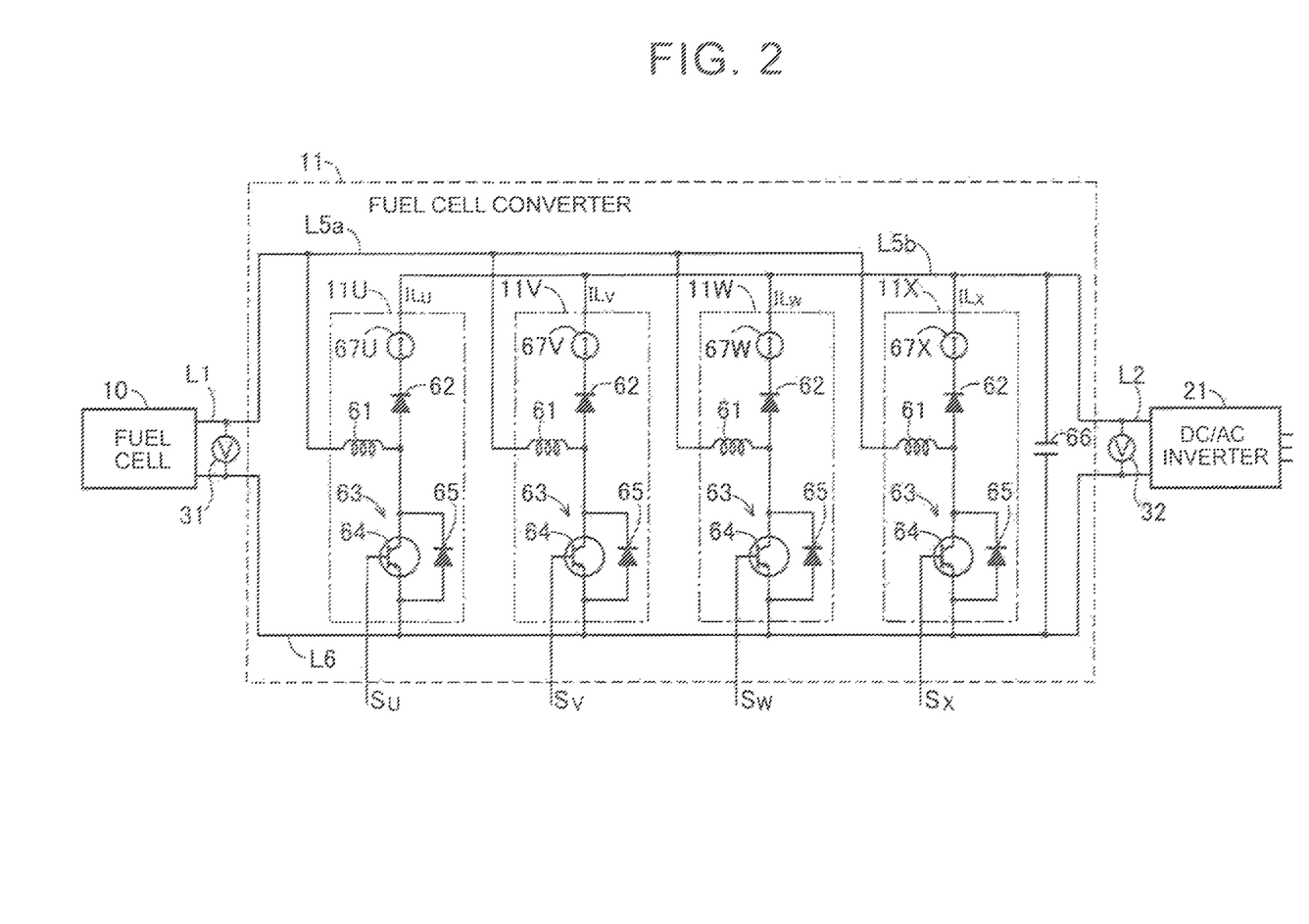
FIG. 2 is a schematic view illustrating a configuration of a fuel cell converter.

FIG. 2 is a schematic view illustrating a configuration of the fuel cell converter 11. In FIG. 2, the fourth direct current lead-wire L4 connected to the second direct current lead-wire L2 is not illustrated herein for convenience. The fuel cell converter 11 is constituted as a four-phase bridge converter, and includes a U-phase circuit portion 11U, a V-phase circuit portion 11V, a W-phase circuit portion 11W, and an X-phase circuit portion 11X. The phase circuit portions 11U, 11V, 11W, 11X are connected to first and second power lines L5a, L5b and an earth line L6.

The first power line L5a is an input-side power line connected to the fuel cell 10, and the second power line 15b is an output-side power line connected to the inverter 21. The earth line 16 is a common earth line to the fuel cell 10 and the inverter 21. A smoothing capacitor 66 is provided in a subsequent stage of the X-phase circuit portion 11X. The smoothing capacitor 66 is connected to the second power line L5b and the earth line L6, and reduces a voltage fluctuation between the second power line L5b and the earth line L6.

The phase circuit portion 11U, 11V, 11W, 11X includes a reactor 6 an output diode 62, and a switching element 63. An input terminal of the reactor 61 of the phase circuit portion 11U, 11V, 11W, 11X is connected to the first power line L5a.

An output terminal of the reactor 61 of the phase circuit portion 11U, 11V, 11W, 11X is connected to the second power line L5b via the diode 62. The diode 62 is provided such that a direction directed toward the second power line L5b from the reactor 61 is taken as a forward direction. A current measuring portion 67U, 67V, 67W, 67X is provided between the diode 62 and the second power line 15b. The current measuring portion 67U, 67V, 67W, 67X is constituted by a current sensor, for example. The current measuring portion 67U, 67V, 67W, 67X measures a reactor current, which is a current flowing from the reactor 61 of the phase circuit portion 11U, 11V, 11W, 11X, and transmits a measured value $I_{LU}$, $I_{LV}$, $I_{LW}$, $I_{LX}$ obtained herein to the controller 50. In the present specification, the measured values $I_{LU}$, $I_{LV}$, $I_{LW}$, $I_{LX}$ of the reactor currents of respective phases are generally referred to a "measured value $I_L$ of the reactor current," or merely referred to, as a "reactor current $I_L$." As such, the current measuring portion 67U, 67V, 67W, 67X measures a reactor current $I_L$, which is a magnitude of an output of a corresponding reactor 61, and can be interpreted as one subordinate concept of an output measuring portion in the present disclosure.

Further, an input terminal of the reactor 61 of the phase circuit portion 11, 11V, 11W, 11X is connected to the earth line L6 via the switching element 63. The switching element 63 is constituted by a transistor 64, and a protection diode 65. The transistor 64 is an npn-type transistor, and is constituted by an Insulated Gate Bipolar Transistor (IGBT), an electric-power Metal Oxide Semiconductor (MOS) transistor, an electric-power bipolar transistor, and the like. The transistor 64 is connected such that a reactor-61 side is a collector and an earth-line-L6 side is an emitter. The protection diode 65 is connected between the collector and the emitter of the transistor 64 in a direction reverse to a direction where a collector current flows.

A corresponding one of control signals $S_U$, $S_V$, $S_W$, $S_X$ each for setting a duty ratio (described later) of a corresponding switching element 63 is input from the controller 50 to a base terminal of the transistor 64 of the phase circuit portion 11U, 11V, 11W, 11X. The switching element 63 of the phase circuit portion 11U, 11V, 11W, 11X repeats turn-on and turn-off in response to a corresponding one of the control signals $S_U$, $S_V$, $S_W$, $S_X$ input therein. In the following description, the control signals $S_U$, $S_V$, $S_W$, $S_X$ for the circuit portions 11U, 11V, 11W, 11X of respective phases are collectively referred to as a "control signal S" without distinguishing them from each other for convenience.

When the switching element 63 is turned on, a current begins to flow into the switching element 63 from the fuel cell 10 via the reactor 61, and a magnetic energy due to direct current excitation is accumulated in the reactor 61. When the switching element 63 is turned off, the magnetic energy accumulated in the reactor 61 during a period when the reactor 61 is turned on is output to the inverter 21 as a current via the diode 62 and the second power line L5b.

As such, while the switching element 63 is turned on and the current flows through the reactor 61 the magnetic energy is accumulated in the reactor 61 as an electrical energy. While the switching element 63 is turned off, the magnetic energy accumulated in the reactor 61 is discharged, so that the current flows through the second power line L5b from the reactor 61.

An induced voltage generated by the magnetic energy accumulated in the reactor 61 when the switching element 63 is turned off is superimposed on an output voltage of the fuel cell 10. Accordingly, a voltage of the second power line L5b, which is output voltages of the phase circuit portions 11U, 11V, 11W, 11X, is higher than a voltage of the first power line L5a, which is the output voltage of the fuel cell 10.

Control signals S are transmitted to the phase circuit portions 11U, 11V, 11W, 11X so that the switching elements 63 of the phase circuit portions 11U, 11V 11W, 11X are turned on sequentially, and output voltages of the phase circuit portions 11U, 11V, 11W, 11X are sequentially superimposed on each other. Hereby, a voltage input into the inverter 21 is maintained higher than the output voltage of the fuel cell 10. Due to the above operation, the fuel cell converter 11 increases the voltage input from the fuel cell 10 and inputs the voltage to the inverter 21.

Figure 3:
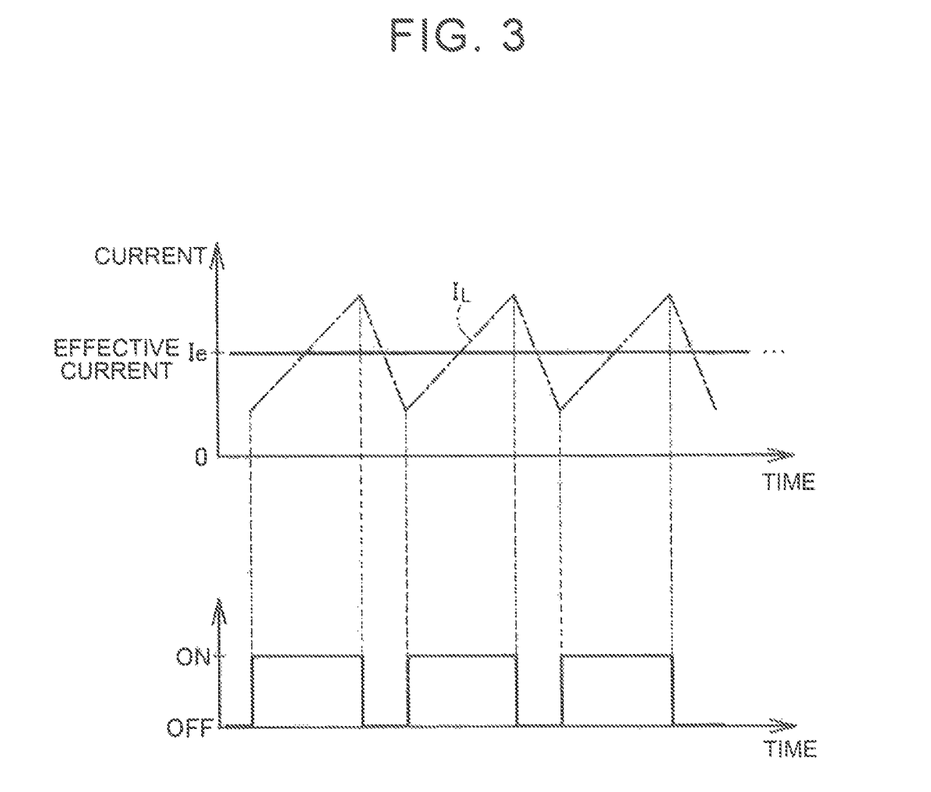
FIG. 3 is an explanatory view to describe a duty ratio of the fuel cell converter.

With reference to FIG. 3, the following describes a duty ratio of the fuel cell converter 11. FIG. 3 illustrates an example of a timing chart illustrating over-time changes of a reactor current $I_L$ and its effective current Ie and ON/OFF timings of the switching element 63. In FIG. 3, the over-time change of the reactor current $I_L$ is indicated by an alternate long and short dash line, and the over-time change of the effective current Ie in the reactor 61 is indicated by a continuous line. In the example of FIG. 3, the effective current Ie in the reactor 61 is generally constant.

The controller 50 sets a duty ratio for the phase circuit portion 11U, 11V, 11W, 11X, the duty ratio being a ratio of a period when the switching element 63 is opened in one cycle, so as to control a current flowing from the reactor 61 of the phase circuit portions 11U to 11X. In the present embodiment, the duty ratios of the phase circuit portions 11U, 11V, 11W, 11X are set in the same setting method, so in the following description, a control of the duty ratio in the fuel cell converter 11 is described without distinguishing the phase circuit portions 11U, 11V, 11W, 11X from each other, for convenience.

As described above, when the switching, element 63 is turned on, the reactor current $I_L$ starts to increase, and when the switching element 63 is turned off, the reactor current $I_L$ starts to decrease. The effective current Ie of the reactor 61 corresponds to a time average of the reactor current $I_L$. Accordingly, when a ratio of a turn-on period of the switching element 63 in one cycle becomes large and a ratio of a turn-off period thereof becomes small, the effective current Ie of the reactor 61 increases. Conversely, when the ratio of the turn-on period of the switching element 63 in one cycle becomes small and the ratio of the turn-off period thereof becomes large, the effective current Ie of the reactor 61 decreases.

Figure 4:
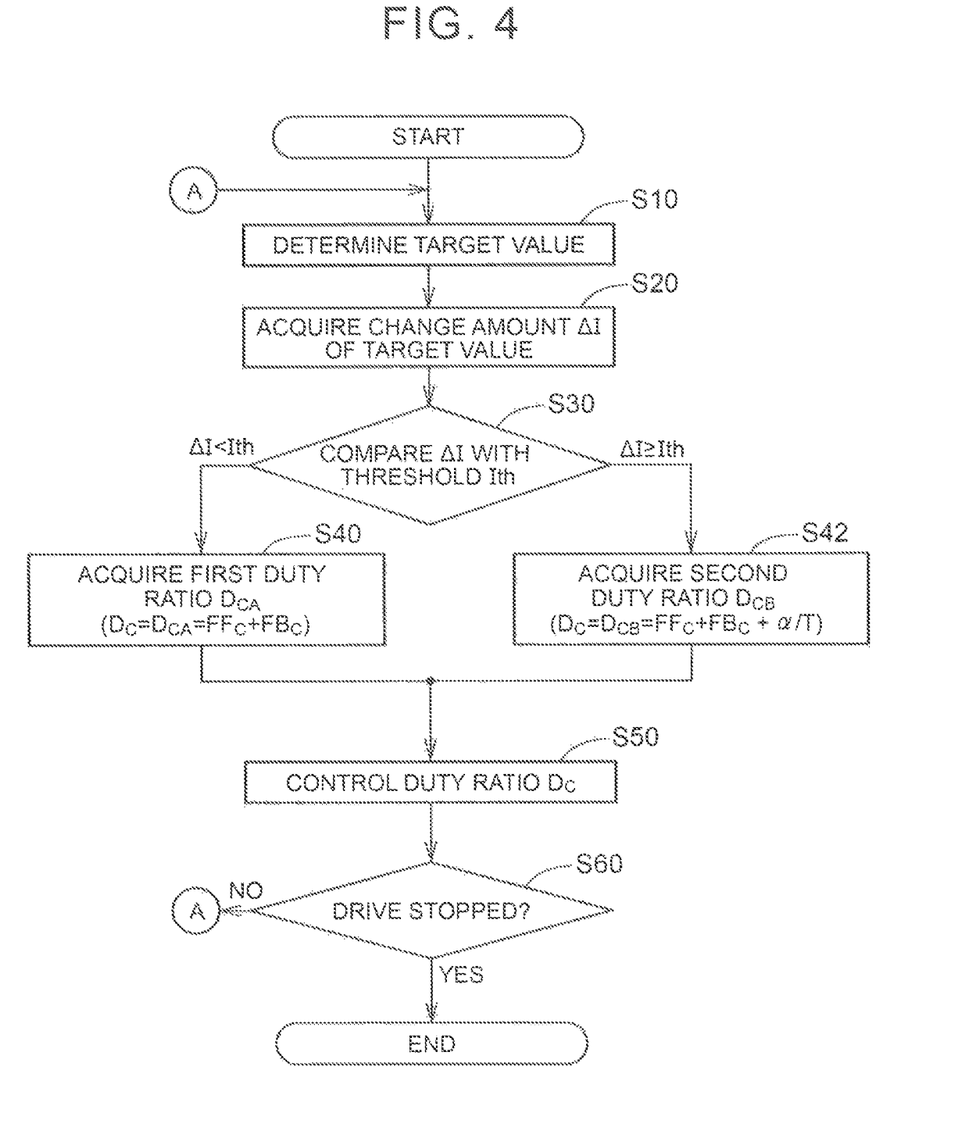
FIG. 4 is an explanatory view illustrating a flow of a control process of the fuel cell converter.

FIG. 4 is an explanatory view illustrating a flow of a control process of the fuel cell converter 11 by the controller 50. The controller 50 performs a feedback control on the output voltage of the fuel cell converter 11 by use of the duty ratio. The control by the controller 50 can be interpreted as a control of the voltage control system incorporated into the fuel cell system 100. After the fuel cell system 100 is started, the controller 50 repeats a series of processes of the following steps S10 to S60 in a predetermined control period until the fuel cell system 100 is stopped. In the present embodiment, the control period of the controller 50 is described on the premise that the control period is the same as an opening/closing period of the switching element 63, which is a driving period of the fuel cell converter 11, for convenience. The control period of the controller 50 may not be the same as the driving period of the fuel cell converter 11, and may be longer than the driving period of the fuel cell converter 11.

In step S10, the controller 50 determines a target electric power to be output from the fuel cell 10 and a target electric power to be input into the inverter 21. The controller 50 acquires an output request from the driver through an accelerator pedal AP of the fuel cell vehicle, and determines the target electric powers according to the output request. Further, in addition to or instead of the output request from the driver, the controller 50 may determine the target electric powers based on a control request generated internally for the operation of the fuel cell system 100 or the fuel cell vehicle, such as an electric power to be supplied to the accessories provided in the fuel cell vehicle. For example, the controller 50 may determine a power generation amount of the fuel cell 10 for warming up of the fuel cell 10 and other accessories based on an outside temperature, a temperature of the fuel cell 10, and a state of charge (SOC) of the secondary battery 15, and then determine the target electric powers based on the power generation amount. At the time of determining the target electric powers, it is preferable to consider present output characteristics (I-V characteristics) of the fuel cell 10, the state of charge (SOC) of the secondary battery 15, and the like. The controller 50 sets a target voltage of the fuel cell 10 to a target value of the input voltage of the fuel cell converter 11. Further, a current target value It, which is a target value of an output current of the fuel cell converter 11, is determined according to the target electric power to be input into the inverter 21. The current target value It is a value of an effective current of the fuel cell converter 11. Further, the controller 50 determines a target value Vt of the output voltage of the fuel cell converter 11 to achieve the current target value It, and a reactor target current value $I_{Lt}$, which is a target value of the output current (effective current) for each reactor 61.

Here, the controller 50 stores a previous value Ip, which is a current target value it in a previous cycle, in its own storage portion. In step S20, the previous value Ip is subtracted from a current target value It (hereinafter referred to as a "present value") in a present cycle so as to calculate a change amount ΔI, which is an increased amount of the present value It with respect to the previous value Ip as illustrated in Expression (1) as follows.

$$\Delta I = It - Ip \tag{1}$$

In step S30, in order to determine a calculation method of a duty ratio $D_C$, the controller 50 performs a determination process on the change amount ΔI. When the change amount ΔI is less than a predetermined threshold Ith, the controller 50 calculates a first duty ratio $D_{CA}$ as the duty ratio $D_C$ in step S40. In the meantime, when the change amount ΔI is not less than the predetermined threshold Ith, the controller 50 calculates a second duty ratio $D_{CB}$ as the duty ratio $D_C$ in step S42. The reason to change the calculation method of the duty ratio $D_C$ depending on the change amount ΔI will be described later. The predetermined threshold Ith may be a value determined in advance experimentally. In the present embodiment, the predetermined threshold Ith is set to a value that may cause a response delay in a case where the feedback control is performed on the fuel cell converter 11 by use of the first duty ratio $D_{CA}$ described below, with a current corresponding to the threshold Ith being taken as a target value.

In step S40, the controller 50 calculates the first duty ratio $D_{CA}$ by adding a feedforward term $FF_C$ and a feedback term $FB_C$, as shown in Expression (2a) as follows. The feedforward term $FF_C$ is one of the terms that constitute a basic term to obtain a duty ratio $D_C$ corresponding to the current target value It, and is a component derived by use of a measured value VL of a present input voltage and a measured value $V_B$ of an output voltage in the reactor 61, or by use of a target value $V_{Lt}$ of the input voltage and a target value $V_{Ht}$ of the output voltage in the reactor 61. In the present embodiment, the feedforward term $FF_C$ is derived by use of the measured value $V_L$ of the present input voltage and the measured value $V_H$ of the output voltage in the reactor 61, and is calculated by Expression (3) as follows, for example. The feedback term $FB_C$ is a component to eliminate a difference between a magnitude of a present output and a target output in the fuel cell converter 11. In the present embodiment, the feedback term $FB_C$ is derived by use of an effective value $I_{em}$ of the reactor current $I_L$ and the reactor target current value $I_{Lt}$. The feedback term $FB_C$ of the first duty ratio $D_{CA}$ is calculated by Expression (4) as follows. A proportional gain $Kp_n$ and an integral gain $Ki_a$ in Expression (4) are predetermined coefficients that can convert a component indicative of a current into a component indicative of a duty ratio. The feedback term $FB_C$ is one of the terms that constitute a basic term to obtain a duty ratio $D_C$ corresponding to the current target value It.

<First Duty Ratio $D_{CA}$>

$$D_{CA} = FF_C + FB_C \tag{2a}$$

$$FF_C = 1 - V_L/V_H \tag{3}$$

$$FB_C = Kp_a \cdot (I_{Lt} - I_{em}) + Ki_a \cdot \Sigma(I_{Lt} - I_{em}) \tag{4}$$

$Kp_a$: the proportional gain, $Ki_a$: the integral gain, $I_{Lt}$: the target value (effective value) of the output current of the reactor 61, $I_{em}$: the measured value (effective value) of the present Output current of the reactor 61, $V_L$: the measured value of the input voltage of the fuel cell converter 11, $V_H$: the measured value of the output voltage of the fuel cell converter 11

In step S42, the controller 50 calculates the second duty ratio $D_{CB}$ by adding an additional term α/t to the basic term constituted by the feedforward term $FF_C$ and the feedback term $FB_C$, as shown in Expression (2b) as follows. The feedforward term $FF_C$ for the second duty ratio $D_{CB}$ may be the same as a value calculated by Expression (3). In the meantime, the feedback term $FB_C$ is calculated by use of a proportional gain $Kp_b$ and an integral gain $Ki_b$ different from those used for the first duty ratio $D_{CA}$, as shown in Expression (4'). Note that the proportional gain $Kp_b$ and the integral gain $Ki_b$ may be 0. In this case, the second duty ratio $D_{CB}$ will be calculated at least by adding the additional term α/T to a basic term constituted only by the feedforward term $FF_C$. The additional term α/T is a component to increase a value of the second duty ratio $D_{CB}$ according to the change amount ΔI, and is derived by use of the change amount ΔI. The additional term α/T is calculated by Expression (5) as follows, for example. The reason to divide a variable α by a period T is to incorporate the variable α that changes according to the change amount ΔI into an expression to obtain a duty ratio.

<Second Duty Ratio $D_{CB}$>

$$D_{CB} = FF_C + FB_C + \alpha T \tag{2b}$$

$$FF_C = 1 - V_L/V_H \tag{3}$$

$$FB_C = Kp_b \cdot (I_{Lt} - I_{em}) + Ki_b \cdot \Sigma(I_{Lt} - I_{em}) \tag{4}$$

$$\alpha/T = (L \cdot \Delta I)/V_{Ht} \tag{5}$$

$Kp_b$: the proportional gain, $Ki_b$: the integral gain, L: an inductance of the reactor 61, T: the opening/closing period of the switching element 63 (the driving period of the fuel cell converter 11)

In the present embodiment, the additional term α/T is a value to which the inductance L of the reactor 61 is reflected. Note that it is desirable that the inductance L be a value found for the reactor 61 of each of the phase circuit portions 11U, 11V, 11W, 11X, and it is preferable that the additional term α/T be derived and set for the reactor 61 of the each of the phase circuit portions 11U, 11V, 11W, 11X. Hereby, the additional term α/T can be a value on which the characteristic of the reactor 61 of the each of the phase circuit portions 11U, 11V, 11W, 11X is reflected. An origin of Expression (5) to derive the additional term α/T and a function and a role of the additional term α/T will be described later.

In step S50, the controller 50 causes the fuel cell converter 11 to perform a boost operation by the duty ratio $D_C$ derived in step S40 or step S42. More specifically, the controller 50 generates a control signal S indicative of a duty ratio $D_C$ and transmits it to the switching element 63 of the phase circuit portion 11U, 11V, 11W, 11X, so as to set an opening/closing driving period of the switching element 63.

The controller 50 repeats processes of steps S10 to S50 in a predetermined control period until the operation of the fuel cell system 100 is stopped (step S60). Note that a case where the operation of the fuel cell system 100 is stopped may be a case where the supply of the electric power from the fuel cell 10 to other parts is cut off, or may be a case where the operation of the fuel cell 10 is stopped.

In the fuel cell system 100 according to the present embodiment, the feedback term $FB_C$ is used for the calculation of the duty ratio $D_C$ of the fuel cell converter 11. Accordingly, after the duty ratio $D_C$ corresponding to the target value It is set, the output voltage of the fuel cell converter 11 can be brought close to the target value $V_{Ht}$ every time the cycle is repeated. Particularly, in the fuel cell system 100 according to the present embodiment, when the current target value It of the fuel cell converter 11 increases by a change amount $\Delta I$ that exceeds a threshold Ith during one cycle, the second duty ratio $D_{CB}$ calculated by use of the additional term $\alpha/T$ is used as the duty ratio $D_C$. Hereby, as described below, followability to the current target value It of the output current of the fuel cell converter 11 is increased.

Figure 5:
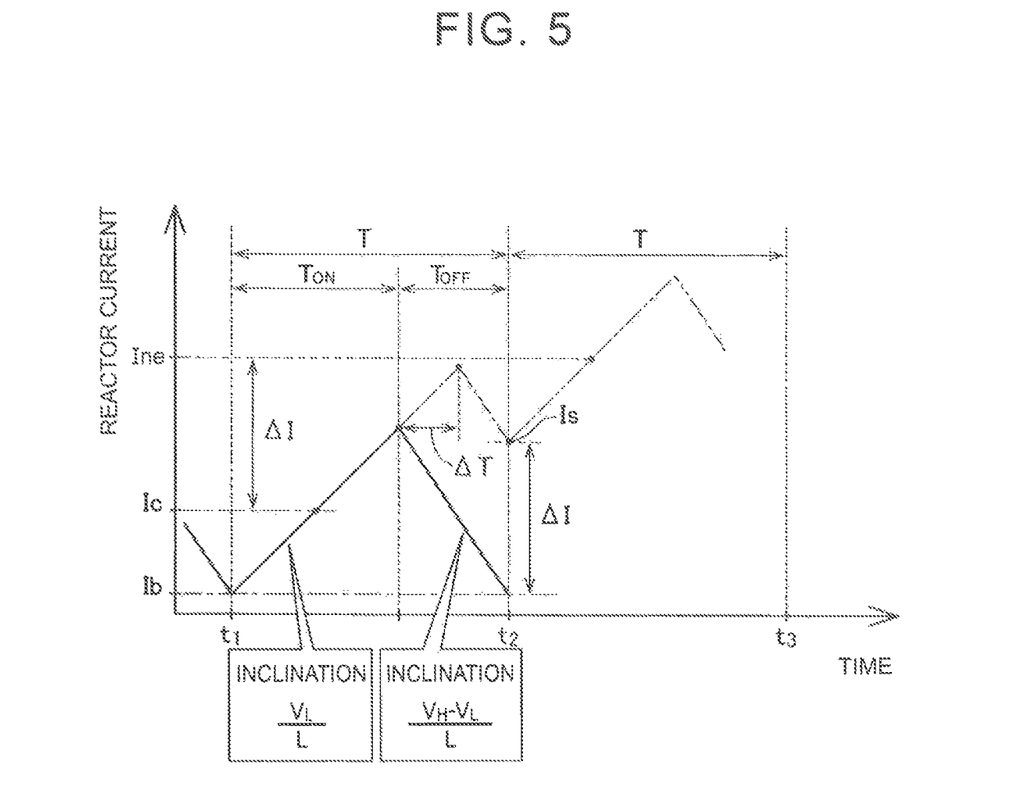
FIG. 5 is an explanatory view to describe a calculation method of an additional term.

FIG. 5 is an explanatory view to describe a calculation method of the additional term $\alpha/T$ used for the calculation of the second duty ratio $D_{CB}$. FIG. 5 illustrates one example of an over-time change of the reactor current $I_L$ during the control in a control period T. It is assumed that a subsequent target value Ine is set during given one cycle (times $t_1$ to $t_2$) in which the reactor current $I_L$ is controlled at a target current Ic of a present current. Note that a turn-on period in this period is indicated by $T_{ON}$ and a turn-off period is indicated by $T_{OFF}$. Further, a change amount $\Delta I$ of the subsequent target value Ine to the present target value Ic is a value that is not less than the predetermined threshold Ith used in step S30 in FIG. 4.

At this time, in order to obtain an effective current of the target value Ine in the reactor 61 in a subsequent period (times $t_2$ to $t_3$), it is desirable that a current Is that is larger than a minimum value Ib of the current in the present period (times $t_1$ to $t^2$) by only the change amount $\Delta I$ be output at the time $t_2$. When a turn-on period to be extended to obtain the current Is at the time $t_2$ is assumed $\Delta T$, a relationship between an extended time $\Delta T$ and the change amount $\Delta I$ is expressed by Expression (6) as follows. $V_L/L$ in Expression (6) is a rate of change of the reactor current $I_L$ to a time during the turn-on period, and $(V_H-V_L)/L$ is a rate of change of the reactor current $I_L$ to a time during the turn-off period. The extended time $\Delta T$ is obtained as Expression (7) from Expression (6).

$$\Delta I=(V_L/L)\cdot(T_{ON}+\Delta T)-\{(V_H-V_L)/L\}\cdot(T_{OFF}-\Delta T)=\{(V_L/L)\cdot T_{ON}-(V_H-V_L)\cdot T_{OFF}\}+(V_H/L)\cdot\Delta T=(V_H/L)\cdot\Delta T \quad (6)$$

$$\because (V_L/L)\cdot T_{ON}-(V_H-V_L)\cdot T_{OFF}=0$$

$$\Delta T=\Delta I\cdot L/V_H \quad (7)$$

The extended time $\Delta T$ of Expression (7) corresponds to a variable $\alpha$ found in Expression (5). That is, in order to achieve the change amount $\Delta I$ in a subsequent control period, the additional term $\alpha/T$ can be interpreted as a component to reflect the extended time $\Delta T$ of the turn-on period, determined according to the change amount $\Delta I$, to the duty ratio. Further, it can be also interpreted as a component corresponding to the extended time $\Delta T$, which is a variation of the duty ratio $D_C$ corresponding to the change amount $\Delta I$ of the target value in one cycle. Further, in the present embodiment, it can be understood that the controller 50 sets the extended time $\Delta T$, which is a variation of the duty ratio in the additional term $\alpha/T$, so that a sum total of a variation of an electrical energy accumulated in the reactor 61 during one cycle and a variation of an electrical energy discharged from the reactor 61 corresponds to a change amount $\Delta I$, which is a variation of a target value during one cycle.

Figure 6:
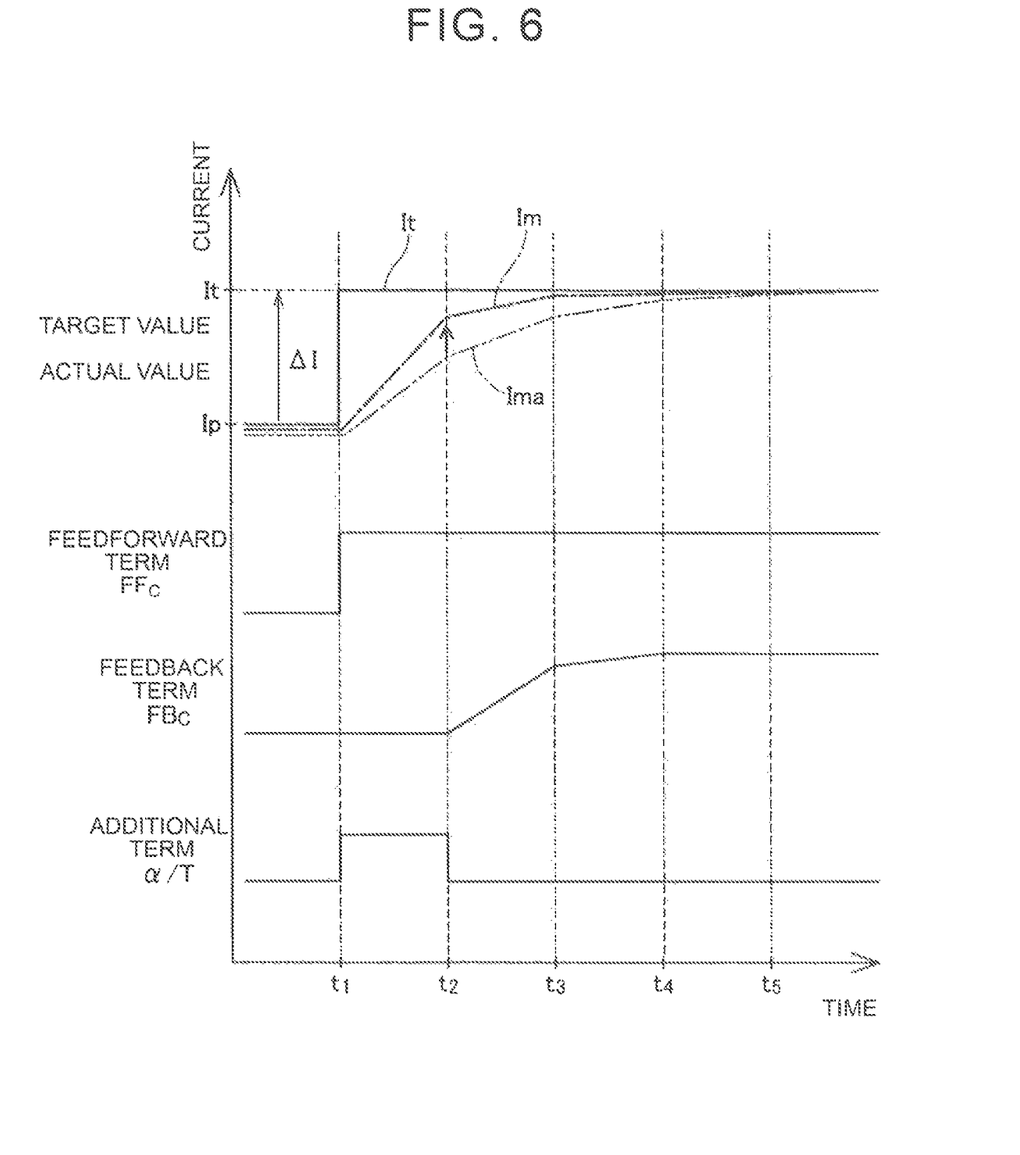
FIG. 6 is an explanatory view illustrating one example of a control of the fuel cell converter.

FIG. 6 is an explanatory view illustrating one example of a timing chart illustrating respective changes of an output current of the fuel cell converter 11, and the feedforward term $FF_C$, the feedback term $FB_C$, and the additional term $\alpha/T$ in the duty ratio $D_C$. A time axis in FIG. 6 is divided by each control period T (times $t_1$ to $t_5$). In an upper part of the timing chart of FIG. 6, a change of the current target value It as a command value is indicated by a continuous line, and an output current Im, which is a measured value of the effective current output from the fuel cell converter 11, is indicated by an alternate long and short dash line. Further, as a comparative example, an output current Ima of the fuel cell converter 11 in a case of a control by use of a duty ratio obtained by deducting the additional term $\alpha/T$ from the second duty ratio $D_{CB}$ is indicated by a two-dot chain line.

Here, during one cycle, the current target value It may exhibit a sudden increase in which that the change amount $\Delta I$ exceeds the threshold Ith. In such a case, in the fuel cell system 100 according to the present embodiment, first, the additional term $\alpha/T$ is added, so that the second duty ratio $D_{CB}$ in which a ratio of the turn-on period is largely increased is used. Accordingly, it is possible to increase the value of the duty ratio $D_C$ before the value of the feedback term $FB_C$ begins to increase, so the output current Im of the fuel cell converter 11 can be brought close to the target value It in a shorter time. Particularly, as described in terms of FIG. 5, the additional term $\alpha/T$ of the present embodiment is a value to which the change amount $\Delta I$ as a variation of the target value It or the inductance L of the reactor 61 is reflected, so an increased amount of the output current Im is controlled appropriately.

Further, in the fuel cell system 100 according to the present embodiment, when a value of the feedback term $FB_C$ begins to increase and a difference between the target value It and a present output current Im becomes small, the first duty ratio $D_{CA}$ in which the additional term off is not added is used instead of the second duty ratio $D_{CB}$. That is, in the fuel cell system 100 according to the present embodiment, when the change amount $\Delta I$ is larger than the predetermined threshold Ith, the additional term $\alpha/T$ is temporarily added to the duty ratio $D_C$ as a transient period when a change of the target output is large. Then, a period when the change amount $\Delta I$ is the predetermined threshold Ith or less is taken as a constant period, and the addition of the additional term $\alpha/T$ to the duty ratio $D_C$ is terminated. As such, in the fuel cell system 100 according to the present embodiment, the additional term $\alpha/T$ is temporarily added to the basic term only during the transient period. Accordingly, it is possible to restrain the turn-on period $T_{ON}$ in one cycle from increasing vainly because of the use of the additional term air for the setting of the duty ratio $D_C$, during the constant period. Accordingly, it is possible to restrain the overshoot that the output current Im of the fuel cell converter 11 largely exceeds the target value It when the transient period shifts to the constant period, so that it is possible to restrain hunting of the output current Im due to such overshoot.

As described above, according to the fuel cell system 100 of the present embodiment, response or followability to the target value of the output current of the fuel cell converter 11 is increased, so that controllability of the fuel cell converter 11 is increased.

Modification 1: In the above embodiment, the fuel cell converter 11 is constituted by a four-phase bridge converter, but the number of phases of the fuel cell converter 11 is not limited to four. The number of phases of the fuel cell converter 11 may be one, two, or three, or may be four or more. Further, in the above embodiment, the fuel cell converter 11 includes the reactor 61 as an element that accumulates an electrical energy. In this regard, the fuel cell converter 11 may include other elements that accumulate an electrical energy, instead of the reactor 61.

Modification 2: In the above embodiment, when the present value It increases relative to the previous value Ip by the change amount $\Delta I$ that exceeds the predetermined threshold Ith, the second duty ratio $D_{CB}$ in which a positive additional term $\alpha/T$ is added is used. In this regard, when the present value It decreases relative to the previous value Ip by a change amount $\Delta I$ that exceeds a predetermined threshold, a second duty ratio $D_{CB}$ in which a negative additional term $\alpha/T$ indicative of a decrement of a duty ratio $D_C$ corresponding to the change amount $\Delta I$ is added may be used. Further, an absolute value of the additional term used when the target value It increases may be different from an absolute value of the additional term used when the target value It decreases. For example, when the target value It decreases, an additional term that is smaller to some extent than one used when the target value It increases may be used.

Modification 3: In the above embodiment, when the change amount $\Delta I$ is less than the predetermined threshold Ith, the first duty ratio $D_{CA}$ derived without using the additional term $\alpha/T$ is set as the duty ratio $D_C$. In this regard, the determination process of step S30 and the control using the first duty ratio $D_{CA}$ may be omitted, and regardless of the value of the change amount $\Delta I$, a control that uses the second duty ratio $D_{CB}$ to which the additional term $\alpha/T$ is added may be performed. Even in such a configuration, when the change amount $\Delta I$ decreases, a value of the additional term $\alpha/T$ also decreases, so the decrease of the controllability due to the addition of the additional term off is restrained. However, in this case, it is desirable for the proportional gain $Kp_b$ and the integral gain $Ki_b$ of the second feedback term $FB_C$ not to be zero.

Modification 4: In the above embodiment, the additional term $\alpha/T$ is calculated by Expression (5) using the inductance L of the reactor 61, the change amount $\Delta I$, and the target value $V_{Ht}$ of the output voltage of the fuel cell converter 11. In this regard, the additional term $\alpha/T$ may be calculated by use of other expressions. For example, the additional term $\alpha/T$ may be calculated by use of the measured value $V_H$ of the output voltage of the fuel cell converter 11 instead of the target value $V_{Ht}$ of the output voltage, and the additional term $\alpha/T$ may be calculated by Expression (8) as follows, for example. According to this, a measured value $V_H$ of a present output voltage can be reflected to the additional term $\alpha/T$.

$$\alpha/T = (L \cdot \Delta I)/V_H \quad (8)$$

Modification 5: in the above embodiment, the feedforward term $FF_C$ of the duty ratio $D_C$ is calculated by Expression (3), the feedback term $FB_C$ is calculated by Expression (4), and the additional term all is calculated by Expression (5). In this regard, the feedforward term $FF_C$ and the feedback term $FB_C$ of the duty ratio $D_C$, and the additional term $\alpha/T$ may be calculated by other expressions, or may be derived by a method other than the method using the expressions. For example, the feedforward term $FF_C$ may be calculated by Expression (3') as follows.

$$FF_C = 1 - V_{Lt}/V_{Ht} \quad (3')$$

$V_{Lt}$: a target value of an input voltage of the fuel cell converter 11, $V_{Ht}$: a target value of an output voltage of the fuel cell converter 11

The feedforward term $FF_C$ may be derived by use of a map by which a value is determined uniquely with respect to a combination of the measured value $V_L$ of the present input voltage and the measured value $V_H$ of the output voltage in the reactor 61, or a combination of the target value $V_{Lt}$ of the input voltage and the target value $V_{Ht}$ of the output voltage in the reactor 61. Further, the feedforward term $FF_C$ may be derived by use of a target value of an input current and a target value of an output current, or may be derived by use of a measured value of an input power and a measured value of an output power.

In the above embodiment, the feedback term $FB_C$ is calculated by Expressions (4), (4') using the effective value $I_{em}$ corresponding to the measured value of the output of the reactor 61, and the reactor target current value $I_{Lt}$ corresponding to the target value of the output of the reactor 61. In this regard, the feedback term $FB_C$ may be derived by use of a map or the like by which a value is determined uniquely with respect to a combination of the effective value $I_{em}$ and the reactor target current value $I_{Lt}$. Further, the feedback term $FB_C$ may be derived by use of the measured value $V_H$ and the target value $V_{Ht}$ of the output voltage as the measured value and the target value of the output of the reactor 61. The feedback term $FB_C$ may be derived by use of the measured value and the target value of the output power of the reactor 61. The feedback term $FB_C$ used for the derivation of the first duty ratio $D_{CA}$ and the feedback term $FB_C$ used for the derivation of the second duty ratio $D_{CB}$ may be different from each other or may be the same, as described in the above embodiment.

The additional term $\alpha/T$ should be derived by use of the change amount $\Delta I$ or by use of the previous value Ip and the present value It. For example, a value that changes according to the change amount $\Delta I$ may be derived uniquely with respect to the change amount $\Delta I$ or a combination of the previous value Ip and the present value It from a map or the like set in advance, for example. The duty ratio $D_C$ may include a component other than the feedforward term $FF_C$, the feedback term $FB_C$, and the additional term $\alpha/T$, as far as the component does not affect the voltage control of the fuel cell converter 11.

Modification 6: In the above embodiment, the controller 50 performs the following controls with respect to the fuel cell converter 11 by use of respective duty ratios to be set based on different criteria: a control of a discontinuous mode in which the target value It is low and the output current of the reactor 61 becomes zero intermittently; and a control of a continuous mode in which the target value It is high and the output current of the reactor 61 is continuously larger than zero during one cycle. In this case, the control of the duty ratio $D_C$ using the additional term in the above embodiment should be applied to at least the control of the continuous mode.

Modification 7: The above embodiment describes an exemplary configuration in which the voltage control system as one embodiment of the present disclosure is applied to the fuel cell system 100 and is used to increase the voltage of the fuel cell 10. In this regard, the configuration of the voltage control system of the present disclosure is not limited to the fuel cell system 100, and may be applied to various devices and systems that generate a voltage. For example, the configuration of the voltage control system of the present disclosure may be applied to a power generating system including a power generation body except a fuel cell.

The present disclosure is not limited to the above embodiment, example, and modifications, and is achievable in various configurations within a range that does not deviate from the scope of the present disclosure. For example, technical features of the embodiment, the example, and the modifications can be replaced or combined appropriately, in order to resolve some or all of the objects described above or in order to achieve some or all of the above effects. Further, the technical features can be deleted appropriately if the technical features have not been described as essential in the present specification.

What is claimed is:

1. A voltage control system that controls an output voltage according to a current target value, the voltage control system comprising:
   a converter device including a reactor that accumulates an electrical energy, the converter device being configured to operate at a duty ratio determined as a ratio of an accumulation period in which the energy is input and accumulated into the reactor in one cycle, so as to increase an input voltage; and
   a controller configured to set the duty ratio according to the current target value so as to cause the converter device to repeatedly perform a boost operation of the input voltage, the controller being configured to set the duty ratio by use of a basic term including a feedforward term, and an additional term, the feedforward term being derived by use of respective target values of a magnitude of an input of the reactor and a magnitude of an output of the reactor, the respective target values being set according to the current target value, the additional term being derived by use of a variation of the current target value during one cycle and being added to change the duty ratio according to the variation.

2. The voltage control system according to claim 1, further comprising:
   an output measuring portion configured to measure the magnitude of the output from the reactor, wherein
   the controller is configured to set the duty ratio by use of the basic term in which a feedback term is added to the feedforward term, and the additional term, the feedback term being derived by use of a measured value of the magnitude of the output of the reactor and the target value of the magnitude of the output of the reactor.

3. The voltage control system according to claim 1, wherein
   the controller sets the additional term such that a sum total of a variation of the electrical energy accumulated in the reactor during the one cycle and a variation of the electrical energy discharged from the reactor corresponds to the variation of the current target value during the one cycle.

4. The voltage control system according to claim 1, wherein
   the controller is configured to use, as the additional term, a value of $\alpha/T$ obtained as $\alpha/T=(L\cdot\Delta I)/V_{Ht}$, wherein $\Delta I$ indicates the variation of the current target value, L indicates an inductance of the reactor, T indicates a period of the one cycle, and $V_{Ht}$ indicates a target value of an output voltage of the reactor, the target value being the target value of the magnitude of the output of the reactor.

5. The voltage control system according to claim 1, further comprising:
   an output measuring portion configured to measure an output voltage of the reactor, wherein
   the controller is configured to use, as the additional term, a value of $\alpha/T$ obtained as $\alpha/T=(L\cdot\Delta I)/V_H$, wherein $\Delta I$ indicates the variation of the current target value, L indicates an inductance of the reactor, T indicates a period of the one cycle, and $V_H$ indicates a measured value of the output voltage of the reactor.

6. The voltage control system according to claim 1, wherein
   the controller is configured such that:
      when the variation is a predetermined threshold or more, the controller sets the duty ratio by use of the basic term and the additional term, and
      when the variation is less than the predetermined threshold, the controller sets the duty ratio without using the additional term.

7. A fuel cell system comprising:
   a fuel cell; and
   the voltage control system according to claim 1, wherein the voltage control system is configured to increase a voltage output from the fuel cell as the input voltage.

8. A voltage control system that controls an output voltage according a current target value, the voltage control system comprising:
   a converter device including a reactor that accumulates an electrical energy, the converter device being configured to operate at a duty ratio determined as a ratio of an accumulation period in which the energy is input and accumulated into the reactor in one cycle, so as to increase an input voltage;
   an input measuring portion configured to measure a magnitude of an input with respect to the reactor;
   an output measuring portion configured to measure a magnitude of an output from the reactor, and
   a controller configured to set the duty ratio according to the current target value so as to cause the converter device to repeatedly perform a boost operation of the input voltage, the controller being configured to set the duty ratio by use of a basic term including a feedforward term, and an additional term, the feedforward term being derived by use of a measured value of the magnitude of the input of the reactor and a measured value of the magnitude of the output of the reactor, the additional term being derived by use of a variation of the current target value during the one cycle and being added to change the duty ratio according to the variation.

9. The voltage control system according to claim 8, wherein
   the controller is configured to set the duty ratio by use of the basic term in which a feedback term is added to the feedforward term, and the additional term, the feedback term being derived by use of the measured value of the magnitude of the output of the reactor and a target value of the magnitude of the output of the reactor, the target value being set according to the current target value.

10. The voltage control system according to claim 8, wherein
    the controller sets the additional term such that a sum total of a variation of the electrical energy accumulated in the reactor during the one cycle and a variation of the electrical energy discharged from the reactor corresponds to the variation of the current target value during the one cycle.

11. The voltage control system according to claim 8, wherein
    the controller is configured to use, as the additional term, a value of $\alpha/T$ obtained as $\alpha/T=(L\cdot\Delta I)/V_{Ht}$, wherein $\Delta I$ indicates the variation of the current target value, L indicates an inductance of the reactor, T indicates a period of the one cycle, and $V_{Ht}$ indicates a target value of an output voltage of the reactor, the target value being the target value of the magnitude of the output of the reactor.

12. The voltage control system according to claim 8, wherein:
the output measuring portion is configured to measure an output voltage of the reactor as the magnitude of the output of the reactor, and
the controller is configured to use, as the additional term, a value of $\alpha/T$ obtained as $\alpha/T=(L\cdot\Delta I)/V_H$, wherein $\Delta I$ indicates the variation of the current target value, L indicates an inductance of the reactor, T indicates a period of the one cycle, and $V_H$ indicates a measured value of the output voltage of the reactor.

13. The voltage control system according to claim 8, wherein
the controller is configured such that:
when the variation is a predetermined threshold or more, the controller sets the duty ratio by use of the basic term and the additional term, and
when the variation is less than the predetermined threshold, the controller sets the duty ratio without using the additional term.

14. A fuel cell system comprising:
a fuel cell; and
the voltage control system according to claim 8, wherein the voltage control system is configured to increase a voltage output from the fuel cell as the input voltage.

15. A control method for a voltage control system including a converter device including a reactor that accumulates an electrical energy, the converter device being configured to operate at a duty ratio determined as a ratio of an accumulation period in which the energy is input and accumulated into the reactor in one cycle, so as to increase an input voltage, the voltage control system being configured to output an output voltage obtained by increasing the input voltage according to a current target value, the control method comprising:
setting the duty ratio according to the current target value so as to cause the converter device to repeatedly perform a boost operation, wherein
the duty ratio is set by use of a basic term including a feedforward term, and an additional term, the feedforward term being derived by use of respective target values of a magnitude of an input of the reactor and a magnitude of an output of the reactor, the respective target values being set according to the current target value, the additional term being derived by use of a variation of the current target value during the one cycle and being added to change the duty ratio according to the variation.

16. A control method of a voltage control system including a converter device including a reactor that accumulates an electrical energy, the converter device being configured to operate at a duty ratio determined as a ratio of an accumulation period in which the energy is input and accumulated into the reactor in one cycle, so as to increase an input voltage, the voltage control system being configured to output an output voltage obtained by increasing the input voltage according to a current target value, the control method comprising:
setting the duty ratio according to the current target value so as to cause the converter device to repeatedly perform a boost operation, wherein a magnitude of an input and a magnitude of an output in the reactor are measured, so that the duty ratio is set by use of a basic term including a feedforward term, and an additional term, the feedforward term being derived by we of a measured value of the magnitude of the input of the reactor and a measured value of the magnitude of the output of the reactor, the additional term being derived by use of a variation of the current target value during the one cycle and being added to change the duty ratio according to the variation.

\* \* \* \* \*